United States Patent [19]

Iliopulos et al.

[11] 3,879,498

[45] Apr. 22, 1975

[54] DIALKYL 1-ACRYLOYLOXY-2-ALKENYL-1-PHOSPHONATES AND DIALKYL 1-METHACRYLOXY-2-ALKENYL-1-PHOSPHONATES

[76] Inventors: Miltiadis I. Iliopulos, 32 Willowbrook Acres, Parkersburg, W. Va. 26101; Werner K. E. Ege, 11 London Ring, 67 Ludwigshafen am Rhine, Germany

[22] Filed: Aug. 31, 1971

[21] Appl. No.: 176,712

[52] U.S. Cl. ............... 260/952; 260/2 P; 260/970; 260/971
[51] Int. Cl. ........................ C07f 9/40; c08f 3/00
[58] Field of Search ................................. 260/952

[56] References Cited
UNITED STATES PATENTS 3,030,347    4/1962    O'Brien et al. ............... 260/952 X

OTHER PUBLICATIONS

Iliopulos, "Beilrage zur chemie phosphororganischen verhindungen" (Thesis), M–I Iliopulos, June 3, 1970.

*Primary Examiner*—Anton H. Sutto
*Attorney, Agent, or Firm*—Neal J. Mosely

[57] ABSTRACT

Dialkyl 1-acryloyloxy-2-alkenyl-1-phosphonates and dialkyl 1-methacryloyloxy-2-alkenyl-1-phosphonates are prepared by reacting a dialkyl 1-hydroxy-2-alkenyl-1-phosphonate with acryloyl- or methacryloyl chloride in the presence of a base, using preferably an inert organic solvent. The dialkyl 1-acryloyloxy-2-alkenyl-1-phosphonates and the dialkyl 1-methacryloyloxy-2-alkenyl-1-phosphonates produced are novel compounds. They are useful as flame retardant and cross-linking comonomers in the preparation of self-extinguishing and/or flame retardant polymers. They also can be homopolymerized to give novel phosphorus containing, self-extinguishing polymers.

8 Claims, No Drawings

DIALKYL 1-ACRYLOYLOXY-2-ALKENYL-1-PHOSPHONATES AND DIALKYL 1-METHACRYLOXY-2-ALKENYL-1-PHOSPHONATES

BACKGROUND OF THE INVENTION

1. FIELD OF THE INVENTION

This invention relates to novel phosphorus containing organic unsaturated compounds and to a process for their preparation. In particular, this invention is concerned with the preparation of novel dialkyl 1-acryloyloxy-2-alkenyl-1-phosphonates and the dialkyl 1-methacryloyloxy-2-alkenyl-1-phosphonates which are useful intermediates for the preparation of homo- and copolymers. These compounds act also as weak cross-linking agents because they possess two olefinic linkages of different reactivities.

2. DESCRIPTION OF THE PRIOR ART

In the course of our investigations of novel vinyl type unsaturated organophosphorus monomers which were carried out during the years 1960-1968 at the Institute of Organic Chemistry and Organic Chemical Technology of the University of Stuttgart (formerly Institute of Technology of Stuttgart) some novel derivatives of the series of the dialkyl 1-acryloyloxy-alkyl-1-phosphonates[*] and the dialkyl 1-methacryloyloxy-alkyl-1-phosphonates[*] have been prepared and tested as flame retardant comonomers. ( 1. werner K. E. Ege, "Darstellung polymerisationsfahiger Phosphonsaeurediester. Versuche zur Herstellung eines flammfesten Polymethacrylats durch Copolymerisation dieser Ester mit Methacrylsaeuremethylester," Dissertation, pages 75, Technische Hochschule Stuttgart, 1964; 2. Miltiadis Ioannu Iliopulos, "Beritraege zur Chemie phosphororganischer Verbindungen", "Habilitationsschrift," pages X+ 368, University of Stuttgart, published end of August, 1970 in the Federal Republic of Germany ).

[*] These compounds are named as dialkyl phosphonoalkyl acrylates and methacrylates in the U.S. Pat. Nos. 2,934,555 and 3,030,347.

These compounds were obtained by the reaction of dialkyl 1-hydroxyalkyl phosphonate with an α,β-unsaturated acyl chloride in the presence of an acid acceptor. However, at that time a number of publications appeared dealing with the preparation of polymerization of some members of the above mentioned classes. ( 3. J. L. O'Brien and C. A. Lane, U.S. Pat. No. 2,934,555, 1960; Chemical Abstracts 54, 18,357 c 1960; 4. C.G. Overberger and E. L. Sarlo, Journal of Organic Chemistry, 26, 4711, 1961; 5. J. L. O'Brien and C. A. Lane, U.S. Pat. No. 3,030,347, 1962; Chemical Abstracts 57,2431 i, 1962; 6. A. N. Pudovik, E. I. Kashevarova and Yu. P. Rudnef, Dokl. Akad, Nauk, SSSR 140, 841, 1961; Chemical Abstracts 56, 3,506, 1962).

Out attention was then devoted to the synthesis, characterization and polymerization of the novel dialkyl 1-acryloyloxy-2-alkenyl-1-phosphonates and the dialkyl 1-methacryloyloxy-2-alkenyl-1-phosphonates described herein in view of the fact that our studies concerning the reaction mechanism of the addition of the dialkyl hydrogen phosphites to α,β-unsaturated aldehydes in the presence of catalytic amounts of a base, had enabled us to improve considerably the yields and purity of the dialkyl 1-hydroxy-2alkenyl-1-phosphonates which are used as starting materials for the preparation of the composition of matter described in this invention. (Reference No. 2).

the dialkyl 1-hydroxy-2-alkenyl-1-phosphonates were for the first time described by A. E. Arbuzov, by A. N. Pudovik and Yu. P. Kitaev and by E. K. Fields.(7. A. E. Arbuzov, Doklady Akad, Nauk SSSR, 73, 499–502, 1950; 8. A.N. Pudovik and Yu. P. Kitaev, Zhurnal Obschei Khimii, 22, 467, 1952; Chemical Abstracts 47; 2,687, 1953; 9. A. N. Pudovik, Zhurnal Obschei Khimii 22, 1371, 1952; Chemical Absracts 47; 4,837, 1953; 10. E. K. Fields, U.S. Pat. No. 2,579,810 (1951); Chemical Abstracts 46; 6,140, 1952).

Our interest in the preparation of the herein described novel dialkyl 1-acryloyloxy-2-alkenyl-1-phosphonates and dialkyl 1-methacryloyloxy-2-alkenyl-1-phosphonates was aroused because these compounds possess two olefinic linkages of different reactivities, and hence on homoor copolymerization are capable of yielding cross-linked polymers which are desirable in the production of flame retardant and/or self-extinguishing polymers for certain industrial applications.

SUMMARY OF THE INVENTION

This invention relates to novel unsaturated phosphorus containing organic compounds and to a process for their preparation. The compounds of this invention are presented by the following general structural formula (1)

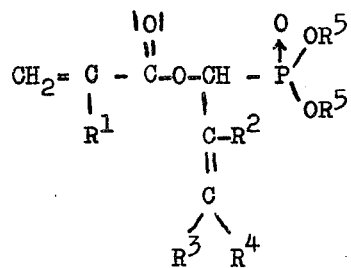

wherein: $R^1$ is a member of the class consiting of hydrogen and methyl. $R^2$ is a member of the class consisting of hydrogen and alkyl groups having one to four carbon atoms, e.g., $CH_3$, $C_2H_5$, iso-$C_3H_7$, etc., $R^3$ and $R^4$ each is independently selected from the group consiting of hydrogen, alkyl of 1 to 4 carbon atoms or phenyl; they may be the same or different. $R^5$ represents an alkyl of 1 to 6 carbon atoms, preferably of 1 to 4 carbon atoms which may be or may not be substituted with halogens, e.g., Cl, Br, F or I.

In accordance with this invention the novel compounds of the invention are prepared by the addition of a dialkyl hydrogen phosphite of formula (2)

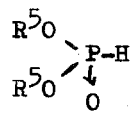

to an α,β-unsaturated aldehyde of formula (3)

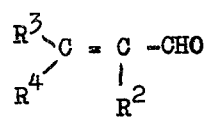

in the presence of a catalytic amount of a base to form the dialkyl 1-hydroxy-2-alkenyl-1-phosphonate of formula (4)

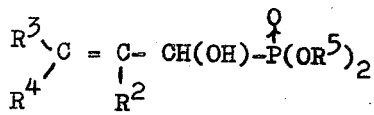

followed by reaction of the latter intermediate with acryloyl- or methacryloyl chloride in the presence of a hydrogen chloride acceptor such as pyridine, triethylamine, dimethylaniline, diethylaniline or sodium carbonate. in the formulas (2), (3) and (4) the substituents $R^2$, $R^3$, $R^4$ and $R^5$ are as defined in formula (1).

The synthetic procedure is illustrated by the following equations (A) and (B):

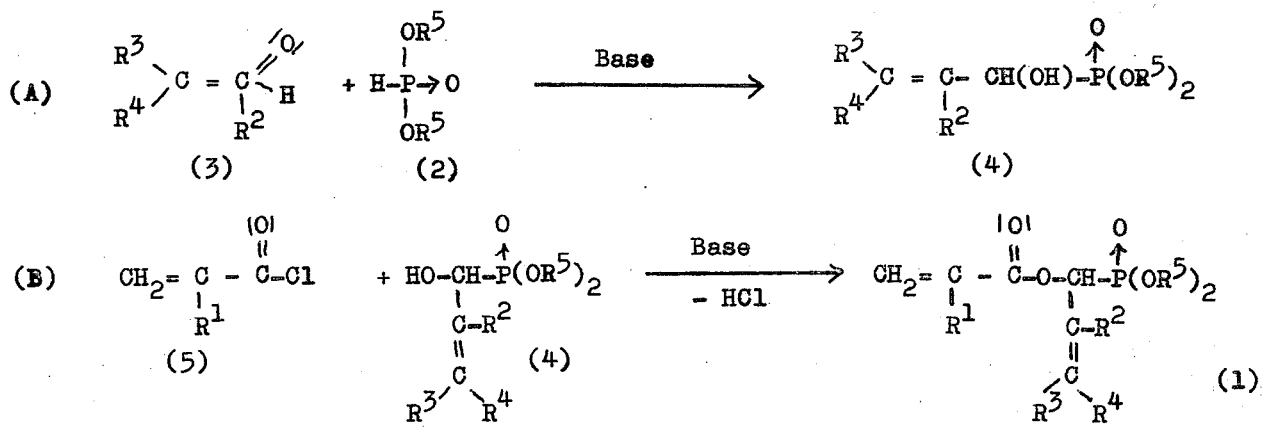

In contacting the reaction according to the equation (A) in the presence of a tert. organic base for the preparation of the intermediate dialkyl 1-hydroxy-2-alkenyl-1-phosphonates the sequence of the charge of the reactants as described by E. K. Fields (reference No. 10) can not be followed because in the most cases the tert. organic base catalyzes strongly the polymerization of the α,β-unsaturated aldehyde, even in the presence of stabilizers and at low temperatures. (11. N. G. Koral'nik "The Chemistry of Acrolein and its Polymers," Sb. Nauchn. Issled. Rabot. Khim. in Khim. Tekhnol., Vysokomolek. Soedin, Tashkentsk. Tekstil'n Inst. 1964, 1, 5–83; Chemical Abstracts 63, 17,882 d, 1965). For example, the polymerization of acrolein in the presence of phosphorus compounds and tert. organic bases has been recently investigated. (12. Deutsche Gold- und Silberscheideanstalt A. G. (DEGUSSA), Dutch Pat. No. App. P 6,411,783 1965; Chemical Abstracts 63, 12,299 h, 1965).

However, the results of our investigations concerning the reaction mechanism of the addition of the dialkyl hydrogen phosphites to certain classes of carbonyl compounds (reference No. 2) has enabled us to elaborate the optimal reaction conditions of the reaction illustrated in equation (A) and therefore to obtain the intermediate dialkyl 1-hydroxy-2-alkenyl-1-phosphonates in high yield and purity. For example, in many instances the crude dialkyl 1-hydroxy-2-propenyl-1-phosphonate can be reacted with the α,β-unsaturated acyl chloride without previous purification. In contacting the reaction according to the equation (B), generally, the reactants are employed in equimolar equantities. However, in view of the fact that in some instances the conversion is not complete and the unreacted dialkyl 1-hydroxy-2-alkenyl-1-phosphonate cannot be removed by distillation because it forms an azeotrope with the dialkyl 1-acryloyloxy- and/or 1-methacryloyloxy-2-alkenyl-1-phosphonate, it may be desirable to employ an excess of the α,β-unsaturated acyl chloride and of the base. In an inert organic solvent is employed in the reaction of the dialkyl 1-hydroxy-2-alkenyl-1-phosphonate with the α,β-unsaturated acyl chloride it is advantageous to use a solvent in which the amine hydrochloride and the acyltrialkylammonium chloride are insoluble so that these by-products can be removed by filtration.

The solvent may be removed by distillation, evaporation or by any other suitable method. The organic solvents utilized in this invention include low molecular weight aliphatic or alicyclic ethers such as diethyl ether, di-isopropyl ether, dibutyl ether, tetrahydrofurane or p-dioxane and aromatic hydrocarbons such as benzene, toluene, xylene and the like.

The phosphorus containing monomers described in this invention can be polymerized alone or can be copolymerized with one or more other vinylidene compounds to form copolymers. Examples of such monomers which can be copolymerized with the dialkyl 1-acryloyloxy-2-alkenyl-1-phosphonates or the dialkyl 1-methacryloyloxy-2-alkenyl-1-phosphonates include acrylic acid, methacrylic acid, methyl acrylate, methyl methacrylate, ethyl acrylate, ethyl methacrylate, lauryl acrylate, lauryl methacrylate, butyl acrylate, styrene, acrylonitrile, vinyl acetate and the like.

the processes of polymerization which may be employed in the preparation of either homopolymers or copolymers include polymerization in bulk, in solution, in emulsion, or in suspension. These methods of polymerization are well known in the art.

the homopolymers derived from the novel organophosphorus compounds described in this invention and certain of their copolymers are particularly useful as flame resistant and/or self-extinguishing novel polymeric compositions. Other applications for the polymers and copolymers are, for example, in coatings, textile and leather finishes.

The following examples are presented to illustrate the novel compounds of this invention and their preparation and utility. It is intended that the examples be considered as illustrative rather than limiting on the invention disclosed as claimed herein.

EXAMPLE 1

Into a 500 ml three necked flask equipped with a reflux- condenser, a mechanical stirrer, a thermometer and a dropping funnel was charged 22.0 grams (0.2 mole) of dimethyl hydrogen phosphite and 11.2 grams (0.2 mole) of freshly distilled acrolein. The resulting mixture was stabilized with 0.75 grams of p-hydroquinone. Through the dropping funnel and over a period of 30 minutes while stirring and cooling there was added dropwise 1.7 ml of a saturated solution of sodium methoxide in absolute methanol. Due to the exotherm the temperature of the reaction mixture rose from −5° to 25°C. Thereafter the reaction mixture was stirred at 30°C for 30 minutes and the free base neutralized with an equivalent amount of glacial acetic acid. To the crude dimethyl 1-hydroxyprepen-2-yl-1 -phosphonate were then added 21,20 grams (0.2 mole) of anhydrous powdered sodium carbonate and the resulting inhomogeneous mixture was diluted with 200 ml of anhydrous diethyl ether. Thereafter 20.91 grams (0.2 mole) of methacryloyl chloride, stabilized with 0.01 gram of copper(I) chloride were added dropwise at 30° to 34°C over a period of 50 minutes. Stirring was continued for 24 hours at room temperature and the temperature finally raised to 37°C. for 1 hour. The reaction mixture was filtered and the ether removed under reduced pressure in the presence of 2.0 grams of N,N'-di-2(1.4-naphthoquinonyl)-p-phenylenediamine.

Distillation of the residue yielded 23.4 grams (50 percent yield) of dimethyl 1-methacryloyloxy-propen-2-yl-1-phosphonate of the formula

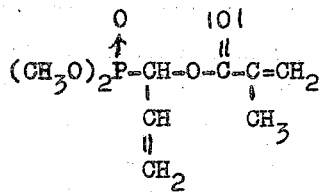

boiling at 93°-96°C/0.1 mm Hg; $n_D^{20}$ = 1.4599.
Analysis: Calcd. for $C_9H_{15}O_5P$ : C 46.15%, H 6.46%, P 13.23%. Found: C 46.47%; H 6.77%, P 13.12% (flame photometry)

In a second run the intermediate dimethyl 1-hydroxy-propen-2-yl-1-phosphonate was subjected to high vacuum fractional distillation to give 28.6 grams (86 percent yield) of an analytically pure sample of this compound boiling at 100°C/0.01 mm Hg.
Analysis: Calcd. for $C_5H_{11}O_4P$: C 36.15%, H 6.68%. Found C 36.01%, H 6.99%

EXAMPLE 2

A mixture of 55.24 grams (0.4 mole) of freshly distilled diethyl hydrogen phosphite and 4.04 grams (0.04 mole) of triethylamine containing 0.06 grams of p-hydroquinone as inhibitor was placed in the apparatus described in example 1. The mixture was cooled to 0°C by external cooling. While maintaining the temperature between 4° and 8°C. by cooling, 22.42 grams (0.4 mole) of distilled acrolein, stabilized with 0.05 gram of p-hydroquinone was added dropwise with vigorously stirring. After completion of the addition the temperature of the stirred reaction mixture was risen to 80°C. within 1 hour, with the aid of an electrically heated oil bath.

Upon removal of the triethylamine under reduced pressure, the crude oily product obtained in a theoretical yield was distilled under nitrogen to give 62.2 grams (80 percent yield) of diethyl 1-hydroxy-propen-2-yl-1-phosphonate of the formula

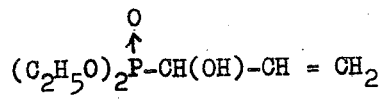

The compound was an odorless and colorless oil boiling at 122°-113°C/0.024 mm Hg.
analysis: Calcd. for $C_7H_{15}O_4P$: C 43.30%, H.7.78%, P 15,95%. Found: C 43.40%, H 7.77%, P 15,93% (flame photometry).

EXAMPLE 3

Using the glass apparatus described in Example 1, a solution of 9.05 grams (0.1 mole) of acryloyl chloride in 20 ml of anhydrous diethyl ether was added dropwise to a vigorously stirred solution of 8.4 grams (0.05 mole) of dimethyl 1-hydroxy-propen-2-yl-phosphonate prepared in Example 1 and 10.1 grams (0.1 mole) of triethylamine in 100 ml of anhydrous tetrahydrofurance containing 0.06 grams of copper(I)-chloride and 0.01 gram of N,N'-di-2-(1.4-naphthoquinonyl)-p-phenylenediamine, both acting as polymerization inhibitors. During the addition of the acryloyl chloride the temperature of the reaction mixture was held below 15°C by external cooling.

After removal of the diethyl ether through evaporation, the reaction mixture was heated with stirring at 60°C. for approximately 1 hour. Thereafter the reaction mixture was cooled to 0°C and the insoluble by-products consisting of the triethylamine hydrochloride and of the adduct of the acryloyl chloride to triethylamine was filtered off. The tetrahydrofurance was then removed under reduced pressure and the obtained crude product redissolved in 120 ml of diethyl ether in order to precipitate the small quantity of the above mentioned salts which was soluble in the tetrahydrofurane-product mixture.

After evaporation of the ether, the crude product obtained in an almost quantitative yield was subjected to high vacuum fractional distillation under nitrogen yielding 6.8 grams (62 percent yield) of analytically pure dimethyl 1-acryloyloxy-propen-2-yl-1-phosphonate of the formula

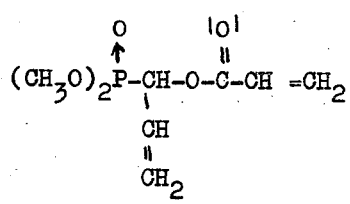

The compound is a colorless liquid boiling at 95°C/0.05 mm Hg; $n_D^{20}$ = 1.4605.
Analysis: Calcd. for $C_8H_{13}O_5P$: C 43.64%, H 5.96%, P 14.07%. Found: C 43.40%, H 6.06%, P 14.30% (flame photometry).

EXAMPLE 4

If in Example 3, methacryloyl chloride (10.54 grams) was employed in place of acryloyl chloride, there was obtained, upon completion of the steps therein described, dimethyl 1-methacryloyloxy-propen-2-yl-1-phosphonate of the formula

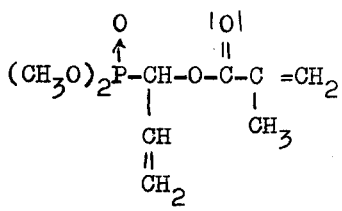

in a 71% yield, as a colorless liquid boiling at 50°C.0.06 mm Hg; $n_D^{20} = 1.4601$.

Analysis: Calcd. for $C_9H_{15}O_5P$: C 46.15%, H 6.46% P 13.23%. Found: C 46.39%, H 6,58, P 13.26% (flame photometry).

Infrared analysis confirmed the structure of the compound.

EXAMPLE 5

Following the procedure of Example 3 and using the same molar proportions of the reactants, diethyl 1-acryloyloxy-propen-2-yl-1-phosphonate was prepared in a 76 percent yield from 9.7 grams diethyl 1-hydroxypropen-2-yl-1-phosphonate and 9.05 grams of acryloyl chloride. Triethylamine was used as acid acceptor. The diethyl 1-acryloyloxy-propen-2-yl-1-phosphonate of the formula

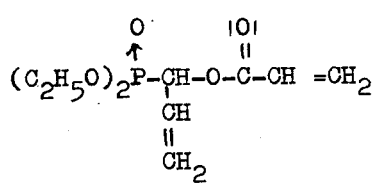

distilled at 90°C/0.03 mm Hg; $n_d^{20} = 1.4532$.

Analysis: Calcd. for $C_{10}H_{17}O_5P$: C 48.39%, H 6.90%, P 12.48%. Found: C 48.48%, H 7.18%, P 12.52% (flame photometry)

EXAMPLE 6

In a similar manner, reaction of methacryloyl chloride with diethyl 1-hydroxy-propen-2-yl-1-phosphonate gave diethyl 1-methacryloyloxy-propen-2-yl-1-phosphonate of the fomula

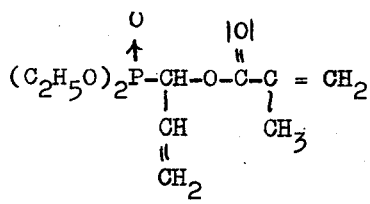

in a 75 percent yield. the colorless liquid compound distilled at 85°–86°C/0.025 mm Hg; $n_D^{20} = 1.4530$.

Analysis: Calcd. for $C_{11}H_{19}O_5P$: C 50.38%, H 7.30%, P 11.81%. Found: C 50.48%, H 7.65%, P 12.28%

EXAMPLES 7–11

A series of additional experiments were carried out which are tabulated below in Table I. These examples illustrate the preparation of a variety of members of this novel class of organophosphorus monomers and demostrate the variation of substituents on each of the reactants.

TABLE I

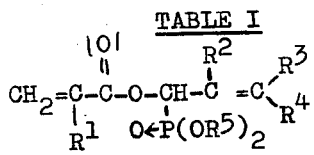

| Exampl. No. | $R^1$ | $R^2$ | $R^3$ | $R^4$ | $R^5$ | %yield |
|---|---|---|---|---|---|---|
| 7 | H | H | H | H | $C_2H_4Cl$ | 87 |
| 8 | H | $CH_3$ | H | H | $isoC_3H_7$ | 85 |
| 9 | $CH_3$ | $CH_3$ | $C_2H_5$ | H | $CH_3$ | 68 |
| 10 | $CH_3$ | $C_2H_5$ | H | $C_2H_5$ | $C_2H_5$ | 60 |
| 11 | $CH_3$ | H | $C_6H_5$ | H | $C_3H_7$ | 59 |

EXAMPLE 12

Homopolymer of dimethyl 1-acryloyloxy-propen-2-yl-1-phosphonate.

Twenty-five grams of freshly distilled dimethyl 1-acryloyloxy-propen-2-yl-1-phosphonate monomer prepared in Example 3 and 0.25 gram of benzoyl peroxide were mixed and placed in small glass vial immersed in an oil bath at 60°C. After 8 hours the vial was removed and its content found to consist of a clear, hard, self-extinguishing homopolymer.

EXAMPLE 13

Homopolymer of dimethyl 1-methacryloyloxy-propen-2-yl-1-phosphonate.

Following the procedure of Example 12 a homopolymer was prepared from 25 grams of dimethyl 1-methacryloyloxy-propen-2-yl-1-phosphonate and 0.25 gram of benzoyl peroxide. There was obtained a clear, hard, self-extinguishing plastic.

EXAMPLE 14

Copolymer of diethyl 1-methacryloyloxy-propen-2-yl-1-phosphonate and methyl methacrylate.

Forty grams of diethyl 1-methacryloyloxy-propen-2-yl-1-phosphonate monomer, prepared in Example 6, 60.0 grams of methyl methacrylate and 1.0 gram of benzoyl peroxide were charged in a beaker and placed in an electric over. The reaction mixture was heated at 60°C. for 4 hours to produce a hard, transparent, amorphous polymer with a phosphorus content of 4.60 percent (Theory 4.68 percent).

Upon testing for flammability by holding a specimen in a flame of a Bunsen burner until ignited the polymer was found to be self-extinguishing.

EXAMPLE 15

Copolymer of dimethyl 1-acryloyloxy-propen-2-yl-1-phosphonate and methyl methacrylate.

Following the procedure of Example 14 a copolymer was prepared from 20.0 grams of dimethyl 1-acryloyloxy-propen-2-yl-1-phosphonate, 80.0 grams methyl methacrylate using 1.0 gram of benzoyl peroxide as initiator.

There was obtained a clear, hard, flame resistant copolymer having a phosphorus content of 2.74 percent. (Theory requires 2.79 percent).

The degree of flame resistance and the physical properties of the polymer can be altered extensively by varying the compostion of the copolymer.

We claim:
1. A compound having the general formula

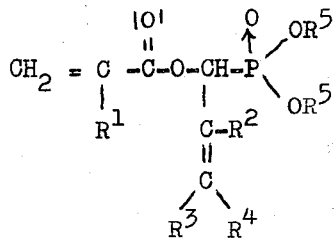

wherein $R^1$ is a member of the class consisting of hydrogen and methyl, $R^2$ is a member of the class consisting of hydrogen and an alkyl group having 1 to 4 carbon atoms, $R^3$ and $R^4$ are independently selected from the class consisting of hydrogen, of an alkyl group of 1 to 4 carbon atoms and phenyl, and $R^5$ is an alkyl or haloalkyl of 1 to 6 carbon atoms, preferably 1 to 4 carbon atoms.

2. A compound as defined in claim 1 in which $R^1$, $R^2$, $R^3$ and $R^4$ are hydrogen, and $R^5$ is methyl.

3. A compound as defined in claim 1 in which $R^1$, $R^2$, $R^3$ and $R^4$ are hydrogen, and $R^5$ is ethyl.

4. A compound as defined in claim 1 in which $R^2$, $R^3$ and $R^4$ are hydrogen, and $R^1$ and $R^5$ are methyl.

5. A compound as defined in claim 1 in which $R^2$, $R^3$ and $R^4$ are hydrogen, $R^1$ is methyl and $R^5$ is ethyl.

6. A compound as defined in claim 1 in which $R^1$, $R^2$, $R^3$ and $R^4$ are hydrogen and $R^5$ is chloroethyl.

7. a compound as defined in claim 1 in which $R^2$, $R^3$, $R^4$ are hydrogen, $R^1$ and $R^5$ is chloroethyl.

8. A compound as defined in claim 1 in which $R^1$, $R^3$ and $R^4$ are hydrogen, $R^2$ is methyl and $R^5$ is isopropyl.

* * * * *